Mar. 27, 1923.

C. R. STEWART

TRACTION DEVICE FOR TIRES

Filed May 13, 1921

INVENTOR.
Carson R. Stewart
BY
ATTORNEY.

Patented Mar. 27, 1923.

1,449,456

UNITED STATES PATENT OFFICE.

CARSON R. STEWART, OF AKRON, OHIO.

TRACTION DEVICE FOR TIRES.

Application filed May 13, 1921. Serial No. 469,083.

*To all whom it may concern:*

Be it known that I, CARSON R. STEWART, a citizen of the United States, residing at Akron, in the county of Summit, State of Ohio, have invented certain new and useful Improvements in Traction Devices for Tires, of which the following is a specification.

The invention relates to an improved device for application to wheels, by means of which the tractive force of the wheel will be increased, which may be easily and quickly applied and will give a maximum amount of gripping action to the wheel enabling the vehicle to be propelled in muddy or sandy roads. Various forms of devices have been constructed and designed for this general purpose, but disadvantages have been found to be present in all such devices, and it is the purpose of my invention to construct a device which will operate easily and surely in assisting the driving action of the car wheels.

It is the object of my invention to produce a boot or shoe in a form which can be easily manufactured which will be composed of a rubber and fabric member which may be reinforced with a metallic center if additional strength or rigidity is desired. This reinforce is formed of any suitable material which will lend rigidity and strength to the armor. This reinforcing member should be flexible and this feature, in combination with the fact that the main portion of the armor is made of rubber and fabric, similar to the casing of the tire, makes a form of attachment which is sufficiently rigid to perform the work expected of it and at the same time will not injure the tire, and will outwear standard forms of chain construction.

It is also the purpose of my invention to construct a traction device that can be placed on the wheel at any time. The chains now in common use surround the periphery of the tire and it is therefore a very difficult and sometimes impossible job to place the chains in position after the car has become stuck in mud or sand. To remedy this disadvantage, my form of traction device may be made in a number of individual sections that can be placed over the wheel and secured in place without being passed under the wheel.

These and other objects will be apparent from the following detailed description of my invention, it being understood that the showing is for the purposes of illustration merely and is not to be considered as limiting the invention to the exact form shown within the scope of the claims.

In the drawings:—

Figure 1:
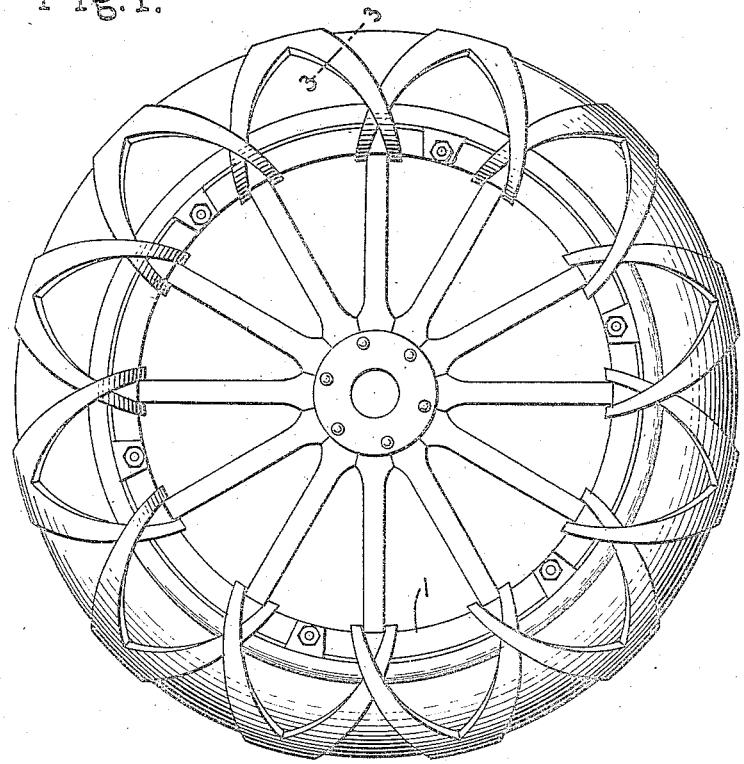
Fig. 1 is a side elevation of a wheel fitted with a full complement of my traction devices.
Figure 2:
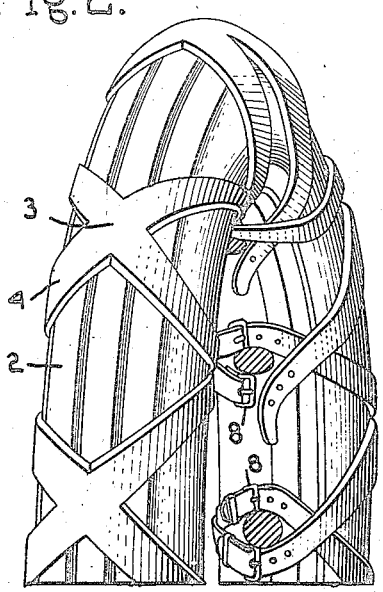
Fig. 2 is a perspective view of a portion of a tire and wheel having the armor applied thereon.
Figure 3:
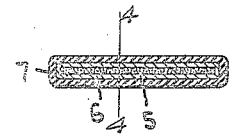
Fig. 3 is a cross section through one of the arms of a single unit, the line 3—3 of Fig. 1 indicating the location at which the view is taken.

A wheel of the spoked type is shown in Fig. 1 at 1, which carries a tire of any type, shown at 2 as a pneumatic tire. These parts are of any well known form and my new tire armor or traction attachment is shown applied and attached thereto, but it is capable of attachment to any type of wheel by slight modifications of the securing devices.

The traction device of my invention is composed of any suitable number of units which are designed to be placed transversely over a tire and secured to the wheel structure. By forming the traction device as indicated, I am enabled to apply the invention to a wheel without passing it about the whole circumference thereof, as is the case with the customary and well known tire chain.

The complete equipment for a wheel is shown in Fig. 1, but it is obvious that the full number is not required in order to obtain the benefits of the invention. The traction devices are made up of a number of units which may be of any suitable form, but are here shown in general X- or cruciform shape, the lines being placed diagonally over the tire. A unit is shown at 3 and is formed of two crossing bands or straps 4 united in the center. The units may be composed of lengths of flexible metallic ribbons or bands 5, which form the centers of the arms of the units and are united at the crossing point in any preferred way. The bands may be made of any suitable metallic substance, braided or woven wire serving the purpose to advantage. The crossing bands may be united in any suitable way at their crossing point, by welding, brazing or if the core of the strip is of woven wire, these two strands may be interwoven. At all events, the crossing strands may advantageously be united in the center and are covered with a layer or layers of fabric 6, which is rubberized. In the case of woven wire being used for the foundation of the band, this is thoroughly filled and saturated with a rubber composition.

Over the fabric layers there is placed a layer of rubber, or rubber composition 7 and the hole unit is vulcanized together under pressure, in suitable molds into a unitary structure.

Figure 4:
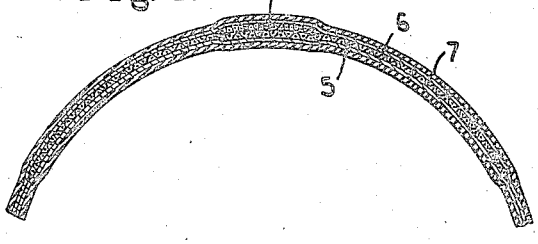
Fig. 4 is a longitudinal section along one of the arms of the device on the line 4—4 of Fig. 3.

The fabric and rubber may, if desired, be extended below the terminus of the wire reinforce, as shown in Fig. 4, and the ends of the unit are provided with any suitable means for attaching it to the wheel structure. The preferred method of fastening may be by means of buckles 8 at the ends of certain of the lines which engage in suitable apertures in the other ends of the units. The ends of the traction devices are brought around the spokes in the form shown and are thus secured in position. If desired, other means may be substituted for holding the units in position, or the ends of the lines may be tied in place.

As far as known to me, I am the first to provide a plurality of individual units adapted to be secured over a tire in such manner that the arms thereof lie diagonally across the tread of the tire, which units are made wholly of flexible material which will not injure the tire. The material comprises rubber with an inner layer of flat fabric which reinforces the rubber and prevents stretching, with or without the addition of the metallic core. This form of armor or driving cleat will give superior gripping action on the road surface, and will effectually prevent front and side skidding. By providing a number of holes for the buckles, the same tire armor will be adaptable for different size tires and it will not be necessary to manufacture a large number of sizes to accommodate all dimensions of tires. Obvious shapes and designs may be constructed to embody the invention and I am not confined to the exact form shown, but am entitled to a full range of equivalents within the scope of my invention and claims.

Claims:

1. A device adapted to be secured to a wheel structure, comprising a relatively narrow band extending across the tire and provided with means by which the wheel may be engaged, said band being formed from a woven wire foundation, impregnated with rubber, a fabric covering and an outer layer of rubber, the whole being vulcanized together to form a unitary traction device.

2. A traction device comprising a cruciform unit, the ends of the arms thereof having means for securing it to a wheel structure, and the body thereof being composed of flexible metallic members secured together at their intersection and surrounded by a covering of elastic material.

3. A traction device comprising a cruciform unit, the ends of the arms thereof passing around and being secured to the wheel structure, the center of the unit being at the tread of the tire and comprising flexible, elastic material.

4. A traction device for tires comprising a plurality of individual units each being composed of two arms which are arranged diagonally of the tire and intersect at the tread, and means at the ends of the arms for securing the unit over the tire, the body of said unit being composed of rubber and a continuous fabric reinforcement extending from end to end of the arms.

5. A traction armor for tires comprising a plurality of individual cruciform units, each unit being composed of intersecting flexible metallic foundations, coverings of fabric about the foundations and an outer layer of rubber vulcanized together.

6. A traction armor for tires, comprising a plurality of individual cruciform units, each unit being composed of flexible metallic foundations extending along the arms of said unit and united at their intersection, a wrapping of fabric about the foundations and a covering layer of rubber vulcanized thereon.

7. A traction armor for tires, comprising a plurality of cruciform units, each unit being composed of inner bands of woven wire extending along the arms of said unit and united at their intersection, a covering of fabric and rubber surrounding said wire vulcanized together to form a homogenous structure.

8. A traction device for wheels comprising a pair of bands crossing at the tread of the tire, and extending around the felly of the wheel, means to secure the ends of the device within the wheel felly, said bands comprising outer layers of rubber vulcanized together at the point of intersection.

9. A traction device for wheels, comprising a pair of bands crossing at the tread of the tire, and extending around the felly of the wheel, means to secure the ends of the device within the wheel felly, said bands comprising outer layers of rubber vulcanized together at the point of intersection, and internally located flexible reinforcing members within the bands.

CARSON R. STEWART.